United States Patent
Papadomanolakis et al.

(10) Patent No.: US 8,380,665 B2
(45) Date of Patent: Feb. 19, 2013

(54) APPLICATION WORKLOAD CAPTURE AND REPLAY SYSTEM

(75) Inventors: Efstratios Papadomanolakis, San Francisco, CA (US); Zhongtang Cai, Redwood Shores, CA (US); Romain Colle, San Francisco, CA (US); Benoit Dageville, Truckee, CA (US); Karl Dias, Foster City, CA (US); Leonidas Galanis, San Jose, CA (US); Rodney Graham, San Francisco, CA (US); Bo Gong, Foster City, CA (US); Qinghui H. Altmar, Cupertino, CA (US); Jae Young Yoon, San Mateo, CA (US); Mehmet Fidanboylu, Palo Alto, CA (US); Tom Hsu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 13/076,313

(22) Filed: Mar. 30, 2011

(65) Prior Publication Data

US 2012/0221519 A1 Aug. 30, 2012

Related U.S. Application Data

(63) Continuation-in-part of application No. 13/034,526, filed on Feb. 24, 2011.

(51) Int. Cl.
*G06F 17/00* (2006.01)
(52) U.S. Cl. ........ 707/615; 707/610; 707/640; 707/661; 707/809; 709/201; 709/248
(58) Field of Classification Search ................. None
See application file for complete search history.

(56) References Cited

U.S. PATENT DOCUMENTS

| | | | |
|---|---|---|---|
| 5,680,610 A | 10/1997 | Smith et al. | |
| 8,024,299 B2 * | 9/2011 | Dias et al. | 707/660 |
| 2004/0015600 A1 * | 1/2004 | Tiwary et al. | 709/234 |
| 2004/0221115 A1 | 11/2004 | Sahin et al. | |
| 2005/0131879 A1 * | 6/2005 | Ghosh et al. | 707/3 |

(Continued)

FOREIGN PATENT DOCUMENTS

WO WO 2008/051855 5/2008

OTHER PUBLICATIONS

Colle et al, "Oracle Database Replay", ACM, 2009.*

(Continued)

*Primary Examiner* — Hung Le
(74) *Attorney, Agent, or Firm* — Hickman Palermo Truong Becker Bingham Wong LLP; Adam C. Stone

(57) ABSTRACT

An application workload capture and replay system with a transactionally consistent application workload replay feature is provided. More particularly, the feature includes capture-phase components for capturing and recording a real application workload submitted to a production web application system and includes replay-phase components for replaying the captured application workload against a test web application system in a transactionally consistent manner. The feature provides guarantees about the order of database transactions that are caused when the workload is replayed such that there is a consistency between the replay-phase order of the database transactions and the order of those transactions that occurred when the workload was captured. These consistency guarantees facilitate a faithful reproduction of database changes observed in the production web application system in the test web application system using a captured real application workload. Significantly, this faithful reproduction may be accomplished without having to create a synthetic application workload that approximates or emulates the transactional behavior of the real application workload. Instead, a real application workload may be used as or substantially as it is captured.

20 Claims, 2 Drawing Sheets

U.S. PATENT DOCUMENTS

| | | | |
|---|---|---|---|
| 2005/0186975 A1* | 8/2005 | Yach et al. | 455/466 |
| 2008/0097960 A1* | 4/2008 | Dias et al. | 707/2 |
| 2008/0097961 A1* | 4/2008 | Dias et al. | 707/2 |
| 2008/0097995 A1* | 4/2008 | Dias et al. | 707/8 |
| 2008/0097996 A1* | 4/2008 | Dias et al. | 707/8 |
| 2008/0098003 A1* | 4/2008 | Dias et al. | 707/10 |
| 2010/0005097 A1* | 1/2010 | Liang et al. | 707/8 |

OTHER PUBLICATIONS

"Database Replay", Oracle White Paper, 2007.*

Galanis et al, "Oracle Database Replay", ACM. 2008, pp. 1159-1170.*

"Notification of Transmittal of the International Search Report and the Written Opinion of the International Searching Authority, or the Declaration" received in PCT application No. PCT/US12/23394 dated Mar. 23, 2012 (11 pages).

Current Claims in PCT application No. PCT/US12/23394 dated Mar. 2012 (4 pages).

Colle et al., "Oracle Database Replay," ACM, 2009 (4 pages).

"Database Replay", Oracle White Paper, 2007 (19 pages).

Galanis et al., "Oracle Database Replay," ACM, 2008, pp. 1159-1170 (12 pages).

* cited by examiner

APPLICATION WORKLOAD CAPTURE AND REPLAY SYSTEM

BENEFIT CLAIM; CROSS-REFERENCE TO RELATED APPLICATIONS

This application claims the benefit as a Continuation-in-part of application Ser. No. 13/034,526, filed Feb. 24, 2011, entitled "Transactionally Consistent Replay of Application Workloads", the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

This application is related to application Ser. No. 11/800,238, filed May 3, 2007, now U.S. Pat. No. 7,890,457, entitled "Transactionally Consistent Database Workload Replay", the entire contents of which is hereby incorporated by reference as if fully set forth herein.

TECHNICAL FIELD

The present invention relates generally to computer systems for testing other computer systems and, more particularly, to computer systems for testing multi-tier web applications.

BACKGROUND

Many large business-critical web applications experience widely varying load and usage during any given period of time. For example, an online shopping web application may undergo a steady and manageable application workload prior to the airing of a television advertisement announcing a promotion offered through the online shopping web application during the Super Bowl or other highly viewed television event. Soon after the airing, the online shopping application may experience a sharp increase or "burst" in application workload resulting from a large number of users simultaneously accessing the online shopping web application attempting to gain the benefit of the promotion. Extended periods of relatively heavy application workload are also common. For example, the shopping application may undergo a high volume application workload the entire week before Christmas.

Variances in application workload during a period of time can cause defects (i.e., bugs) to manifest in a web application that are difficult to predict beforehand. Prediction is difficult because the defects only readily occur under certain, difficult to replicate, operating conditions such as a high volume or highly concurrent application workload. As such, solutions have been developed to aid application developers and testers in diagnosing and troubleshooting such difficult to predict defects.

In one approach, a real application workload submitted to a production web application in a production environment is captured and replayed against a replica of the web application in a test environment with the goal of reproducing the production environment behavior in the test environment where the reproduced behavior can be analyzed and diagnosed by application developers and testers, perhaps repeatedly. However, with most web applications, this approach in and of itself will not reliably reproduce the order of database data changes observed in the production environment. Using this approach, reliable reproduction of database changes is difficult or impractical because most web applications are affected by non-deterministic factors that are difficult or impractical to control when replaying the captured application workload. Examples of such non-deterministic factors include concurrently executing processes and threads, network latency, hardware timers and interrupts, and thread context switching, among others.

Unreliable reproduction of database changes when replaying a captured application workload presents at least two problems. First, if the occurrence of a defect observed in the production environment depended on the order of database changes in the production environment, then that defect may not be reproduced when the application workload is replayed. The defect may not be reproduced because non-deterministic factors in the test environment may cause the order of database changes to diverge from the order that occurred in the production environment. Second, if the order of database changes in the test environment is allowed to diverge from the order of database changes in the production environment, then an error that did not occur in the production environment may occur in the test environment, potentially even preventing the defect observed in the production environment from being reproduced in the test environment.

As an example of these two problems together, consider a web application for purchasing a seat on an airline flight. Assume that in the production environment, two concurrent application requests (REQ1, REQ2) from two users are made to the web application to reserve the same airline seat on the same flight. Further assume the user (USER1) submitting REQ1 is able to reserve the airline seat while the user (USER2) submitting REQ2 is not able to reserve the seat, the seat being already reserved by USER 1. In response to REQ1, a data change is made to a database to reflect USER1's reservation of the seat. Subsequently USER1 issues another request (REQ3) to the web application cancelling his prior reservation and that as a result of REQ3 an unexpected defect occurs in the web application.

Captured requests REQ1, REQ2, and REQ3 are then replayed in the test environment for the purpose of reproducing the defect. In the test environment, when REQ1 and REQ2 are concurrently replayed, it may be that because of non-deterministic factors in the test environment REQ2 is able to reserve the airline seat for USER2 while REQ1 is not able to reserve the seat for USER 1 even though REQ1 was able to reserve the seat for USER1 in the production environment. In response to REQ2 in the test environment, a data change is made to a database to reflect USER2's reservation of the seat. When REQ3 is replayed in the test environment, it may fail not because of the unexpected defect that caused REQ3 to fail in the production environment, but because REQ3 in the test environment is attempting to cancel the reservation for USER1 that does not exist in the test environment database. Thus, by not reliably reproducing database changes in the test environment, an error can occur in the test environment that did not occur in the production environment that masks the "true" defect. Consequently, this approach is less than optimal.

In another approach, an application workload representative of a real application workload is captured. The captured representative application workload is replicated as necessary to create a "synthetic" application workload that approximates the volume and concurrency of the real application workload. For example, the representative application workload might comprise a number of requests made by a single user to a web application in a production environment. A synthetic workload approximating a real application workload comprising N concurrent users may be created by replicating the captured requests N times. However, because of non-deterministic factors in the web application, creating a synthetic application workload that can reliably and faithfully reproduce database changes caused by the real application workload may be impractical. Further, a human user is typically required to design the synthetic application workload. At best, this approach is time consuming, expensive, and error-prone.

As a result of these disadvantages, existing testing systems do not reliably reproduce a real application workload and do not scale well. Accordingly, a better solution is sought.

DETAILED DESCRIPTION

Figure 1:
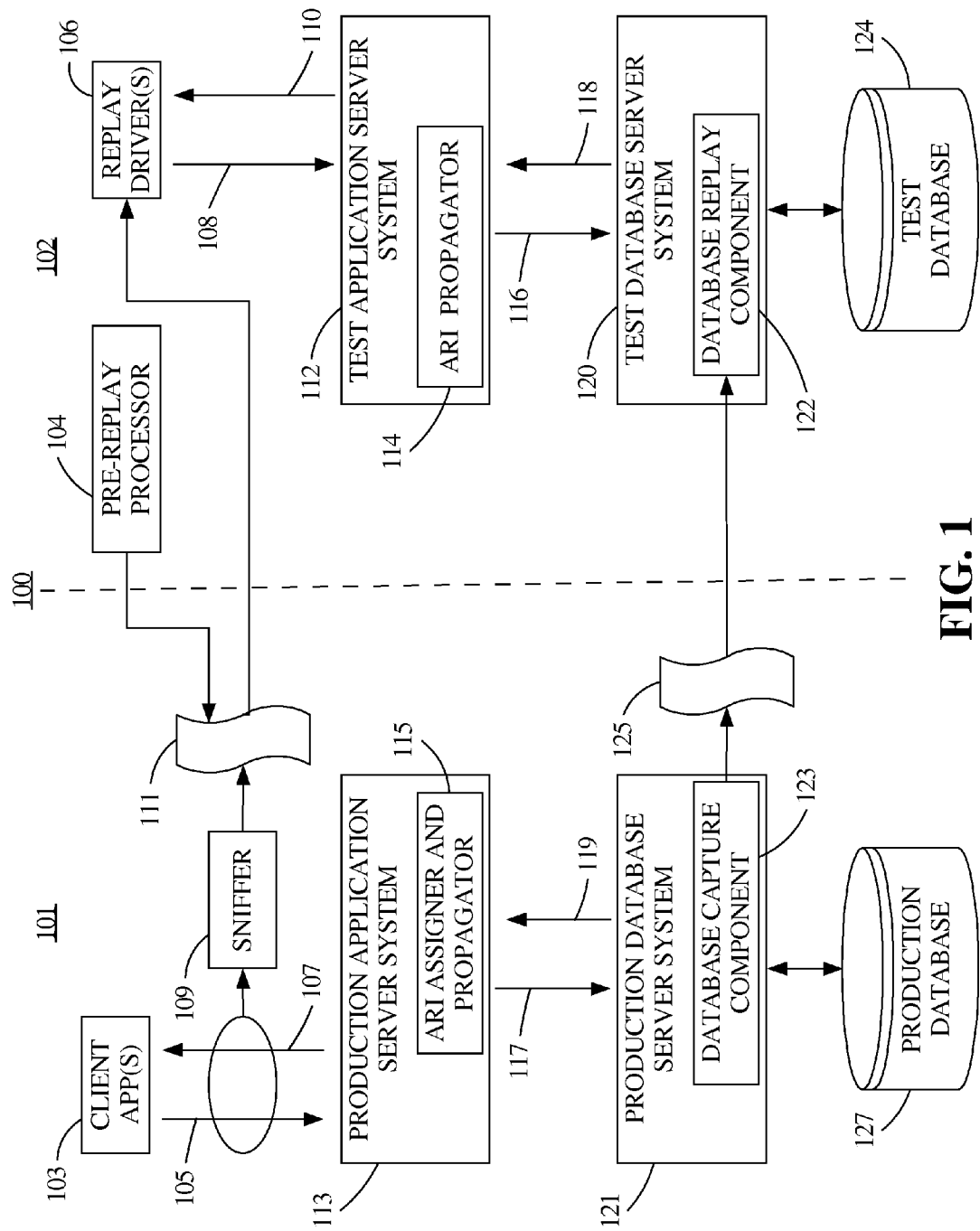
FIG. 1 is a functional block diagram and schematic illustration of an application workload capture and replay system according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An application workload capture and replay system with a transactionally consistent application workload replay feature is provided. More particularly, the feature includes capture-phase components for capturing and recording a real application workload submitted to a production web application system and includes replay-phase components for replaying the captured application workload against a test web application system in a transactionally consistent manner. The feature provides guarantees about the order of database transactions that are caused when the workload is replayed such that there is a consistency between the replay-phase order of the database transactions and the order of the transactions that occurred when the workload was captured. These consistency guarantees facilitate a faithful reproduction of database changes observed in the production web application system in the test web application system using a captured real application workload. Significantly, this faithful reproduction may be accomplished without having to create a synthetic application workload that approximates or emulates the transactional behavior of the real application workload. Instead, a real application workload may be used as or substantially as it is captured.

According to one embodiment of the invention, a test web application system (referred to herein as the "test system") is subjected to the same or substantially same application workload to which a production web application system (referred to herein as the "production system") was subjected. To subject the test system to the same or substantially same workload to which the production system was subjected, capture-phase components capture and record an application workload that a production application server system receives from external entities. The application workload comprises one or more application requests such as, for example, one or more Hypertext Transfer Protocol (HTTP)-based requests sent from web browsing applications executing on client computing devices. In addition, the capture-phase components capture and record database log sequence numbers assigned by a production database server system to database commands executed by the production database server system during the capture-phase that make permanent changes to the production database (e.g., SQL COMMIT commands). In addition, the capture-phase components capture and record information linking the executed database commands to the application requests that caused them to be executed. More specifically, the capture-phase components capture and record application request identifiers sent in database requests from the production application server system. For a given database request, the application request identifier in the database request identifies that the application request that caused the given database request to be sent from the production application server system.

The captured information is then processed in preparation for the replay-phase, potentially in a non-real-time, out-of-line manner. Such processing may include processing the captured application requests to ready them for replay against the test application server system. For example, Uniform Resource Locators (URLs) of captured application requests may be remapped to new or different URLs, passwords and other application request state such as browser cookies, etc. may need to be converted and/or remapped. Environment specific application request data such as date-time information in captured application request may be replaced. Such processing may also include constructing a commit point ordering dependency graph or tree from the captured database log sequence numbers and database commands as described in greater detail below.

During the replay-phase, one or more processes external to the test system send the processed application workload to the test application server system. Replay-phase components in the test system use information captured during the capture phase, including the information linking application requests to database commands, to ensure that database commands caused by application requests during the replay phase are executed by the test database server system in a manner that is transactionally consistent with the way those database commands were executed by the production database server system during the capture phase. As a result, the test system is subjected to the same or substantially same application workload to which the production system was originally subjected in a transactionally consistent manner without having to create or fabricate a synthetic application workload.

Thus, according to embodiments of the present invention, application capture and replay systems are disclosed that include, for example, building blocks such as:

a capture-phase component for capturing and recording application requests submitted to a production application server system;

a capture-phase component for capturing and recording database log sequence numbers assigned to database commands executed by a production database server system;

a capture-phase component for capturing and recording information linking database commands executed by the production database server system to the capture-phase application requests that caused those database commands to be executed;

a replay-phase component for resubmitting captured application requests to a test application server system;

a replay-phase component for ensuring that replay-phase database commands are executed by a test database server system in a manner that is transactionally consistent with the way those database commands were executed during the capture phase.

It will be understood that these, and other associated building blocks and components, may be configured as stand-alone logic elements, or may be combined together in one or more logic element assemblies, as needed or appropriate for the particular implementation at hand. Each logic element may be implemented in software, hardware, firmware, or a combination thereof.

Application Workload Capture and Replay System Overview

Referring now to FIG. 1, therein is shown a functional block diagram and schematic illustration of an application workload capture and replay system 100 according to an embodiment of the present invention. The system 100 includes a production web application system 101 and a test web application system 102. Production web application system 101 includes client application(s) 103, a production application server system 113, a production database server system 121, and a production database 127. Test web application system 101 includes pre-replay processing component 104, replay driver(s) 106, a test application server system 112, a test database server system 120, and a test database 124. Production system 101 is configured to operate during a capture phase. Test system 102 is configured to operate during a replay phase.

Capture Phase Overview

In one embodiment, the capture phase roughly corresponds to a period of time (hereinafter referred to as the "capture interval") during which one or more application requests 105 are submitted by one or more client applications 103 to the production application server system 113. The capture interval can, for example, be as short as a few minutes or shorter or as long as a week or longer, depending on the requirements at hand. During the capture phase, network sniffer 109 captures application requests 105 and records them in an application workload capture log 111. Thus, at the end of the capture phase, the application workload capture log 111 has a record of all application requests 105 from the client application(s) 103 to the production application server system 113 sent during the capture interval.

Also during the capture interval, an application request identifier assigner and propagator 115 in the production application server system 113 assigns a unique identifier (hereinafter referred to as an "application request identifier", or just "ARI") to incoming application requests 105 received at the production application server system 113 during the capture interval. Each assigned ARI is unique at least amongst all ARIs assigned during the capture interval. In addition to assigning an ARI to incoming application requests 105, the assigner and propagator 115 ensures that assigned ARIs are propagated to the production database server system 121 in any database requests 117 that are caused by the application requests 105. For example, an application request 105 to reserve a seat on an airline flight will likely cause a database request 117 to update the database 127 so as to effect a reservation of that seat. Thus, all database requests 117 received at the production database server system 121 during the capture interval include an identifier (the "ARI") of the application request 105 that caused the database request 117 to be sent.

Also during the capture interval, a database capture component 123 in the production database server system 121 captures database log sequence numbers assigned by the production database server system 121 to database commands (e.g., SQL commands) executed by the production database server system 121 against the production database 127 that make data changes to the production database 127 permanent (e.g., SQL COMMIT commands). The database log sequence numbers assigned by the production database server system 121 reflect the order in which the database commands were executed against the production database 127 during the capture interval. The database commands are received in database requests 117. Thus, each database request 117 has one or more corresponding database commands and has a corresponding ARI identifying the application request 105 that caused the database request. The database capture component 123 records the database commands and their associated captured database log sequence numbers in a database workload capture log 125. In addition, the database capture component 123 captures the ARIs included in database requests 117 and records the ARIs in the database workload capture log 125 in association with corresponding database commands and database log sequence numbers. Thus, at the end of the capture phase, the database workload capture log 125 has a record of all database commands that were executed against the production database 127 by the production database server system 121 during the capture interval that make changes to the production database 127 permanent and for each such database command, a record of database log sequence number(s) assigned to the database command and an identifier of the application request 105 that caused the database command to be executed.

Pre-Replay Phase Overview

In one embodiment, before an application workload 111 is replayed against the test system 102, the application workload 111 may undergo automated pre-replay phase processing by pre-processing component 104. This automated processing may be performed in a non-real-time or off-line manner. For example, after the network sniffer 109 has finished storing data in application workload 111, processes external to production system 101 may process captured application workload 111. This processing may be performed while the production system 101 services further requests from client applications 103. Thus, the processing of captured workload 111 may be performed without any interference with or impact on the operations of the production system 101.

In one embodiment, pre-replay processing includes associating captured application requests with the ARIs assigned to those requests by the assigner and propagator 115 during the capture phase.

Replay Phase Overview

In one embodiment, after captured application workload 111 has undergone processing as discussed above, replay driver(s) 106 read the processed workload from captured workload 111 and send the processed workload as replayed application requests 108 to test application server system 112. Each replayed application request 108 includes the ARI that was assigned to that request during the capture phase. In sending the processed workload to test application server system 112, replay driver(s) 106 subject the test system 102 to the substantially same workload to which client application(s) 103 subjected the production system 101 during the capture phase.

Also during the replay phase, an application request identifier propagator 114 in the test application server system 112 ensures that ARIs received in replayed application requests 108 are propagated to the test database server system 120 in any replay-phase database requests 116 that are caused by the replayed application requests 108. Thus, all or virtually all replay-phase database requests 116 received at the test database server system 120 during the replay phase include an identifier (an "ARI") of the replayed application request 108 that caused the replay-phase database request 116 to be sent.

Also during the replay phase, a database replay component 122 in the test database server system 120 ensures that replay-phase database commands are executed by test database server system 120 in a manner that is transactionally consistent with the way those database commands were executed during the capture phase. More particularly, during the capture phase, the database replay component 122 maintains a replay logical clock. In one embodiment, the replay logical clock is initially set at the start of the replay phase to the lowest database log sequence number associated with a database command in the database workload capture log 125. The replay logical clock may be separate from other logical clocks maintained by the test database server system 120.

During the capture phase, replay-phase database requests 116 arrive at the test database server system 120 having been caused by the replayed application requests 108. When a replay-phase database request 116 arrives at the test database server system 120, the database replay component 122 captures the ARI included in the request. Before the test database server system 120 executes a replay-phase database command included in a replay phase database request 116 against the test database 124, the database replay component 122 uses the captured ARI to identify in the database workload capture log 125 the database log sequence number(s) that were assigned to that database command during the capture phase. The database replay component 122 compares these database log sequence number(s) to the replay logical clock to determine whether the database command is ready to be executed against the test database 124.

A replay-phase database command in question is ready to execute against the test database 124 if all dependent replay phase database commands that happened before the replay phase command in question during the capture phase have already been executed during the replay phase. If a dependent replay phase database command has not yet been executed, then the command in question is delayed by the database replay component 122 until all dependent replay phase database commands have been executed against the test database 124. In this way, the system 100 provides a guarantee about the order of database changes in the test database 124 during the replay phase that is consistent with the order of database changes in the production database 127 during the capture phase. This guarantee is provided despite non-deterministic factors in the test system 102 that affect the timing and ordering of operations in the test application server system 112 and the test database server system 120. The system of the present invention improves the efficacy of testing a web application using a real application workload captured from a production environment.

Returning to the example above involving two users concurrently attempting to purchase the same seat on the same airline flight. When requests REQ1, REQ2, and REQ3 are captured and replayed using an application capture and replay system like system 100 of FIG. 1, the system 100 would guarantee that USER2 will not be able to reserve the airline seat during the replay phase even if, because of non-deterministic factors in the test system 102, USER2's database command to reserve the airline seat is ready to execute against the test database 124 before USER1's database command is ready to execute. Instead, USER2's database command will be delayed by the database replay component 122 until USER1's database command has executed, thereby preserving the database command execution order that occurred during the capture phase. Further, when REQ3 is replayed during the replay phase, it will not fail because it is attempting to cancel the reservation for USER1 that does not exist in the test database 124

Detailed Operation of the Application Workload Capture and Replay System

To illustrate in greater detail how the application workload capture and replay system in accordance with one embodiment of the present invention may be used to capture and replay a real application workload in a transactionally consistent manner, further operational details of the system will now be described.

At the outset, it should be noted that while the system may be embodied in a single computer (e.g., the computer system 200 of FIG. 2), in one embodiment, as shown in FIG. 1, the system is embodied in a multi-tier web application system comprising a client tier, an application tier, and a database tier. Further, while the capture and replay phases may occur in the context of a single instance of a multi-tier web application, in one embodiment, as shown in FIG. 1, the capture and replay phases occur in the context of separate instances of the multi-tier web application system. For example, the production system 101 may be deployed in a data center or other production facility, while the test system 102 may be deployed in a lab environment or other test facility.

Production system 101 comprises one or more client application(s) 103 connected to a production application server system 113 via a network. The production application server system 113, in turn, is connected to a production database server system 121 via a network. The production database server system 121 has access to a production database 127. The client application(s) 103 may be connected to the production application server system 113 using any conventional network. Similarly, the production application server system 113 may be connected to the production database server system 121 using any conventional network.

Test system 101 comprises one or more replay driver(s) 106 connected to a test application server system 112 via a network. The test application server system 112, in turn, is connected to a test database server system 120 via a network. The test database server system 120 has access to a test database 123. The replay driver(s) 106 may be connected to the test application server system 112 using any conventional network. Similarly, the test application server system 112 may be connected to the test database server system 120 using any conventional network.

The client application(s) 103 and the replay driver(s) 106 may be embodied in one or more client computing devices. For example, a client application 103 might be a web browsing application ("browser") executing on a personal computing device such as a desktop computer or smart phone and a reply driver 106 might be, for example, a browser simulator program or other computer application for simulating functionality of a client application 103.

The production application server system 103 generally operates as one or more processes independent of the client application(s) 103 and the production database server system 121. The production database server system 121 generally operates as one or more processes independent of the client application(s) 103 and the production application server system 113.

The test application server system 112 generally operates as one or more processes independent of the replay driver(s) 106 and the test database server system 120. The test database server system 120 generally operates as one or more processes independent of the replay driver(s) 106 and the test application server system 112.

Any networks connecting components of systems 101 and 102 may comprise one or more conventional network systems, including a Local Area Network (LAN) or a Wide Area Network (WAN), as is known in the art.

The network connecting client application(s) 103 and the production application server system 113 includes functionality for packaging application requests 105 and application responses 107 in accordance with a well-known application-level network protocol (e.g., the Hyper-Text Transfer Protocol (HTTP)) together with any payload or parameter information into one or more data packets sent between the client application(s) 103 and the production application server system 113. Similarly for the network connecting replay driver(s) 106 and the test application server system 112 with regard to replayed application requests 108 and replay-phase application responses 110.

The network connecting the production application server system 113 and the production database server system 121 includes functionality for packaging database requests 117 and database responses 119 in a well-known data manipulation language (e.g., the Structured Query Language (SQL)) together with any parameter information into one or more data packets sent between the production application server system 113 and the production database server system 121. Similarly for the network connecting the test application server system 112 and the test database server system 120 with regard to replay-phase database requests 116 and replay-phase database responses 118.

Handling Requests Sent to the Application Server System

To facilitate concurrent handling of application requests 105 from the client application(s) 103, each application request 105 may be handled within the production application server system 113 in its own separate "thread" of execution that can concurrently execute with other threads within the production application server system 113. Thus, at any given time during the capture interval, the production application server system 113 may be concurrently handling multiple application requests 105. Similarly, at any given time during the replay phase, the test application server system 112 may be concurrently handling multiple replayed application requests 108.

Within the context of handling an application request 105 from a client application 103, the production application server system 113 may send one or more database requests 117 to the production database server system 121. Each database request sent from the production application server system 113 may comprise one or more database commands. Such database commands may include Structured Query Language (SQL) statements, for example. SQL statements may be separated generally into two categories: data manipulation language (DML) statements for reading and writing data and conducting database transactions; and data definition language (DDL) statements for describing and maintaining the database. Examples of DML SQL statements include SELECT, UPDATE, INSERT, DELETE, BEGIN TRANSACTION, COMMIT TRANSACTION, etc. Examples of DDL SQL statements include CREATE TABLE, CREATE INDEX, etc. Thus, an application request 105 sent by a client application 103 to the production application server system 113 may cause the production application server system 113 to send one or more database requests 117, each request 117 comprising one or more database commands to be executed against the production database 127. Transitively, an application request 105 may cause one or more database commands to be executed against the production database 127. Similarly, during the replay phase, a replayed application request 108 may cause one or more database commands to be executed against the test database 124.

Handling Requests Sent to the Database Server System

During the capture phase, the production database server system 121 executes database commands relative to the production database 127. As a result, the production database server system 121 may store data in, and/or retrieve data from, the production database 127. The database production database server system 121 may execute two or more database commands in a transactional manner, so that none of the effects of the database commands in a single transaction are made permanent in the production database 127 unless all of the effects of those database commands can be made permanent. This also applies to test database server system 120 and test database 124 with regard to database commands executed by the test database server system 120 during the replay phase.

Database Logical Clock and Database Log Sequence Numbers

The production database server system 121 maintains a logical clock to uniquely identify versions of the production database 127. In one embodiment, the logical clock is a sequence number that the production database server system 121 increments each time changes to the production database 127 are made permanent. In one embodiment, the production database server system 121 increments this sequence number each time a database transaction is committed to the production database 127. Thus, in one embodiment, each distinct version of the production database 127 may be uniquely identified by the logical clock sequence number assigned by the production database server system 121 to the committed transaction that resulted in that version of the production database 127, referred to hereinafter as the version's database log sequence number.

Database log sequence numbers assigned to different versions of the production database 127 may be numerically compared to determine the order of the versions in time (e.g., to determine whether one version happened before or happened after another version). In one embodiment, numerically greater database log sequence numbers indicate later-occurring database versions than are indicated by the numerically lesser database log sequence numbers that precede them. In one embodiment, database log sequence numbers assigned by the production database server system 121 to versions of the production database 127 are each a combination of multiple database log sequence numbers. For example, a database log sequence number may be a combination of a 32-bit base sequence number and a 16-bit overflow sequence number. Other data formats are possible. All possible data forms are within the scope of the present invention.

Network Sniffer

During the capture phase, the network connecting client applications 103 and the production application server system 113 includes a network sniffer 109. The network sniffer 109 may be implemented as one or more separate concurrently executing processes or as one or more concurrently executing threads of the same process, for example. In one embodiment, the network sniffer 109 collectively, transparently, and non-intrusively captures all application requests 105 that the production application server system 113 receives during the capture interval from external entities (e.g., client application(s) 103). In an exemplary embodiment, a network packet sniffer or network protocol analyzer is used to capture the application requests 105. In another embodiment, a proxy server (e.g., a HTTP proxy server) disposed in the network between the client applications 103 and the production application server system 113 is used to capture the application requests.

In one embodiment, an application workload comprises one or more application request(s) 105 originating from one or more client application(s) 103 or one or more other process(es) external to the production application server system 113. The network sniffer 113 stores and records this workload as data in the application workload capture log 111. As a result, the captured application workload may comprise workload that was captured during a particular interval of time. In one embodiment, the capture phase corresponds to this particular interval of time. In one embodiment of the invention, the captured application workload represents actual real-world use of the production application server system 113, which use is not specifically for any testing purpose.

In one embodiment, in addition to capturing all application requests 105 that the production application server system 113 receives during the capture interval from external entities, the network sniffer 109 (or proxy server as the case may be) captures all application responses 107 to those requests 105 that the production application server system 113 sends during the capture interval to the external entities.

Post-Capture Processing

After the network sniffer 109 has stored a captured application workload in captured workload log 111, captured workload log 111 may undergo post-capture processing. This processing may be performed in a non-real-time manner. For example, after the network sniffer 109 has finished storing data in the captured workload log 111, other processes may process the stored data. In one embodiment, this post-capture processing is performed in between the capture phase and the replay phase. In one embodiment, this post-capture processing includes converting captured workload 111 to a different data format. For example, the captured workload 111 may be converted from raw network packet data to eXtensible Markup Language (XML) formatted data.

In one embodiment of the invention, after application workload 111 has been captured, but before application workload can be replayed by replay driver(s) 106 to test application server system 112, various dependencies in application workload 111 might need to be discovered. For example, application request session and URL dependencies might need to be discovered. In one embodiment of the invention, before application workload 111 is replayed to test application server system 112, data in application workload 111 that represent theses dependencies is added to or replaced within application workload 111 by pre-processing component 104. In one embodiment of the invention, the pre-processing that involves the adding or replacing of this data is performed "off-line" relative to the capture and replay phases.

In one embodiment of the invention, the data added to the application workload 111 indicates the order in which the various application requests of captured workload 111 need to be replayed. In one embodiment of the invention, the data added to the application workload 111 represents a dependency graph that indicates the order in which sets of application requests should be replayed in order to duplicate the application workload that production application server system 113 received during the capture phase. In one embodiment of the invention, data of Uniform Resource Locators (URLs) and Hypertext Transfer Protocol (HTTP) cookies in workload 111 are replaced or modified to account for environmental differences between the production application server system 113 and the test application server system 112.

Beneficially, in on embodiment, once capture workload 111 has been pre-processed as described above, processing capture workload 111 can be replayed multiple times, relative to different test application systems, without recapturing the workload represented therein, and without re-processing the workload as described above.

Replay Controller and Replay Drivers

In one embodiment, after the captured application workload log 111 has undergone post-capture processing as discussed above, one or more replay controller(s) 103 read the processed workload from captured workload 111 and instruct one or more replay driver(s) 106 to send that processed workload to the test application server system 112. Replay driver(s) 106 may be implemented as one or more separate concurrently executing processes or as one or more concurrently executing threads of the same process, for example. In sending the processed workload to the test application server system 112, the replay driver(s) 106 subject the test application server system 112 to the same or substantially same application workload to which client application(s) 103 subjected the production application server system 113 during the capture phase.

In one embodiment of the invention, the replay driver(s) 106 synchronize the sending of captured requests 108 that they send to the test application server system 112 so that the differences in time between the test application server system's 112 receipt of those captured requests 108 corresponds to the differences in time between the production application server system's 113 previous receipt of those same requests during the capture phase. Thus, in one embodiment of the invention, the duration of the interval of time during which replay driver(s) 106 send captured requests 108 to the test application server system 112 is identical or nearly identical to the capture interval.

Each of replay driver(s) 106 can replay application requests that were captured by multiple separate network sniffers 109. Therefore, there may be fewer replay driver(s) 106 than network sniffers 109. Each of replay driver(s) 106 may be multi-threaded.

Differences Between the Production System and the Test System

While in some embodiments the same application server system is used in both the capture and replay phases, in other embodiments the production application server system 113 used during the replay is different in one or more respects from the test application server system 112 used during the capture phase. For example, the test application server system 112 might be an upgraded version of the production application server system 113. For another example, the test application server system 112 might be the same brand and version of the production application server system 113, but the test application server system 112 might be configured differently (e.g., in one or more settings) from the production application server system 113. For yet another example, the test application server system 112 might be an entirely different brand of application server system from the production application server system 113. The test application server system 112 might execute on a machine that has different hardware than the hardware of the machine on which the production application server system 113 executes. The test application server system 112 might execute in conjunction with a different operating system than the operating system in conjunction with which the production application server system 113 executes. The purpose of subjecting the test application server system 112 to the substantially same workload as that to which the production application server system 113 was actually subjected may be to determine whether the difference between the test application server system 112 and the production application server system 113, and/or the difference in the environments in which those application server systems execute, is a permissible or desirable difference. Similarly as between the production database server system 121 and the test database server system 120.

Differences between the production database 127 and the test database 124 are also tolerated. For example, the manner in which logical relational database structures are physically laid out and stored on disk in the test database 124 might differ from the manner in such logical relational database structures are physically laid out and stored on disk in the production database 127. Thus, although the values present in the data that is stored in the production database 127 will be the same as the values present in the data that is stored in the test database 124, the manner in which those values are stored on disk may differ between the two databases. Additionally, the manner in which relational tables are partitioned in the test database 124 may differ from the manner in which corresponding relational tables are partitioned in the production database 127. Additionally, indices that are (or are not) constructed for relational tables in the test database 124 may differ from indices that are (or are not) constructed for corresponding relational tables in the production database 127. The purpose of subjecting the test application server system 112 to the substantially same application workload as that to which the production application server system 113 actually was subjected may be to determine whether the difference between the test database 124 and the production database 127 is a permissible or desirable difference. Typically, the test database 124 is not merely a backup, mirror, or fail-over of the production database 127.

The Initial State of the Test Database for the Replay Phase

The capture phase may begin at a time at which the production database 127 is already in a certain state. For example, at the time that the capture phase begins, the production database 127 might already contain one or more logical data structures (e.g., database tables, stored procedures, triggers, views, indices, etc.) which might already be populated with data. If the test database 124 does not also contain these structures by the time that the replay driver(s) 106 begin to "replay" the captured application workload 111, then the execution of database commands during the replay phase relative to the test database 124 might produce errors.

Therefore, in one embodiment, before the replay driver(s) 106 begin to replay the captured application workload 111 to the test application server system 112, the test database 124 is placed in the same or substantially same logical state that the production database 127 was at when the capture-phase commenced. This may be accomplished by "backing up" the production database 127 just prior to the capture phase and performing a restore, from the resulting backup data, to the test database 124, for example.

Replay Phase Timing

The time interval during which replay driver(s) 106 replay captured application workload 111 to the test application server system 112 may be completely non-overlapping and non-concurrent with the time interval during which the network sniffer(s) 109 intercept and store that workload. For example, the network sniffer(s) 198 might intercept and record the application workload 111 during a first time interval. Hours, days, or even weeks after the end of that first time interval, the replay driver(s) 106 might replay the captured application workload 111 to the test application server system 112 during a second time interval that is not concurrent with any part of the first time interval.

Assignment of Application Request Identifiers

According to one embodiment, the production application server system 113 is modified to include an application request identifier assigner and propagator component 115 for assigning a unique application request identifier (ARI) to each incoming application request 105 received at the production application server system 113 during the capture interval. Preferably, such assignment is handled by the production application server system 113 itself, and does not require modifications to or customized logic in applications executing on the production application server system 113. In one embodiment, an ARI is unique amongst all application requests 105 assigned an ARI by the assigner 115 during a certain period of time. For example, an ARI assigned to an application request 105 may be unique amongst all application requests 105 assigned an ARI by the assigner 115 during a particular capture interval corresponding to a particular capture phase.

In one embodiment in which the production application server system 113 is a web application server system or other web system responsive to HTTP requests, each incoming HTTP request 105 received at the production application server system 113 is assigned a unique ARI. More particularly, before the incoming HTTP request 105 is handed off by the production application server system 113 to an application for further request handling within the application server system 113, the assigner 115 generates a unique ARI for the incoming HTTP request. The generated ARI is then set by the assigner 115 as a HTTP request header in the incoming HTTP request such that the incoming HTTP request appears to downstream request processing within the production application server system 113 as if the HTTP request header was set by the client application 103 that originated the HTTP request 105. For example, the assigner 115 might be implemented as part of pre-request handling component of the production application server system 113 that processes incoming HTTP requests 105 before they are handed off to an application executing on the production application server system 113 for further request handling.

In an embodiment, the assigner 115 also sets the ARI assigned to an incoming application request 105 in the outgoing response 107 to the application request 105. In one embodiment, in which the production application server system 113 is a web application server system, the ARI assigned to an incoming HTTP request 105 is set by the assigner 115 as diagnostic information in the "Server" response field of the outgoing HTTP response 107 to the HTTP request.

In one embodiment, the assigner 115 is implemented using an application request and response handling "hook". In this implementation, that production application server system 113 calls or invokes the assigner 115 for each application request 105 received at the production application server system 113. This provides the assigner 115 the opportunity to generate a unique ARI for the incoming application request 105 and set the ARI in request data (e.g., as an HTTP request header) where it is available to other components and modules of the production application server system 113.

In one embodiment, the production application server 113 also calls or invokes the assigner 115 after an application has handled the incoming request 105 but before a complete response 107 to the incoming request 105 is sent to the requesting client application 103. This post-request handling invocation of the assigner 115 by the production application server system 115 provides the assigner 115 the opportunity to set the assigned ARI in the response 107 to the incoming request 105.

Pre-Replay Processing of Application Workload

In one embodiment, as part of pre-replay processing of application workload capture log 111, data of each captured application response stored in the log 111 is parsed. The captured response data is parsed for the ARI that was set in that response 107 when sent from the production application server system 113. That ARI is then set, in the application workload capture log 111, in the data of the corresponding captured application request 105 that caused that response 107 during the capture phase.

For example, in an embodiment in which captured application requests 105 and responses 107 conform to the HTTP protocol, each HTTP response captured in the application workload capture log 111 is parsed to locate the ARI assigned to the HTTP request that caused that response. The ARI is located in a pre-specified location within the response. For example, the ARI may be stored as diagnostic information in the Server response field of each HTTP response. The ARI extracted from the HTTP response is then set in the application workload capture log 111 as a request header in the corresponding captured HTTP request (i.e., the HTTP request that caused the HTTP response from which the ARI was extracted). In other words, the data of the captured HTTP request in the application workload capture log 111 is modified to add the request header specifying the extracted ARI. In this way, even though the originally captured HTTP requests did not include ARI, the processed captured HTTP requests will include their assigned ARIs when replayed during the replay phase.

In an embodiment in which the production application server system 113 is also used as the test application server system 112, the assigner 115 is configured to detect whether an incoming replayed application request 108 already contains an ARI as would be the case during the replay phase. If so, the assigner 115 does not assign a new ARI to the incoming replayed application request 108. In this way, the ARIs assigned to captured application requests 105 during the capture phase are preserved when those captured application requests are replayed during the replay phase.

Propagation of Application Request Identifiers

Also shown in FIG. 1, both the production application server system 113 and the test application server system 112 include an application request identifier propagator.

The ARI propagator propagates the ARI for an incoming application request in each database request that is caused by the incoming application request. According to one embodiment, the ARI is propagated by the application server system to the database server system by modifying an "application context" data structure in the database server system prior to issuing the database request to the database server system. For example, the application server system may embed a "SetApplicationContext" command in the database request sent to the database server system. The application context is set to include the application request identifier of the application request causing the database request. Preferably, propagation of application request identifiers is handled by the application server system itself, and does not require modifications to or customized logic in the applications executing on the application server system.

Database Replay Capture Mechanism and Database Replay Synchronization Mechanism

Also shown, the production database server system 121 includes a database capture component 123. The test database server system 120 includes a database replay component 122. If the same database server system is used during the capture and replay phases, then that database server system includes both the database capture component 123 and the database replay component 122.

As described above, a database request 117 received at the production database server system 121 during the capture phase will include the application request identifier of the application request 105 that caused the production application server system 133 to send the database request 117 to the production database server system 121. The database request 117 may also include one or more database commands to be executed against the production database 127.

Capturing the Transactional Environment

Each database command executes in the context of a "transactional environment". The transactional environment in which a database command executes dictates which version of the database the database command "sees" when the database command is executed against the database.

For example, a first database request 117 from the production application server system 113 to the production database server system 121 might include database commands in the context of a first transaction at the same time that a second database request 117 includes database commands in the context of a second transaction. The first transaction might include a SQL command, "INSERT INTO T1 VALUES ('A')." The second transaction might include a SQL command, "SELECT*FROM T1." This "SELECT" command might execute after the "INSERT" command has been executed. Under such circumstances, the "SELECT" command in the second transaction should not see the insertion of the value "A" into table "T1" unless the first transaction has been committed. If the "SELECT" command executes before the first transaction has been committed, then the "SELECT" statement should not see the first transaction's effects on table "T1."

To ensure that no transaction should see the effects of another transaction that has not yet committed, a database log sequence number may be assigned to each database command. Each database log sequence number reflects the transaction environment in whose context the corresponding database command should be processed. In one sense, each database log sequence number signifies a "snapshot" of the database state. A database log sequence number is a "logical time value" that reflects the state of the database that should be visible to the corresponding command when that command is executed or otherwise processed. In one embodiment of the invention, higher database log sequence numbers indicate later-occurring database states than are indicated by the lower database log sequence numbers that precede them. However, it is possible for multiple database commands to have the same database log sequence numbers.

In one embodiment, among potentially other information that is captured during the capture phase by the database capture component 123, information about the "transactional environment" for each database command executed against the production database 127 is captured. The captured transactional environment information is stored in the database workload log 125 in conjunction with the application request identifier included in the database request that contained the database command.

In one embodiment of the capture phase, database log sequence numbers assigned to database commands are captured by the database capture component 123 and stored in a database workload capture log 125. The database capture log 125 may be part of the database 127. For example, the database capture log 125 may be a table in the database 127. In such case where the database capture log 125 is part of the database 127, transaction environment information for database commands executed against the database capture log 125 may not be captured by the database capture mechanism 123. All or a portion of the database capture log 125 may be outside the database 127. For example, the database capture log 125 may be an XML file.

In one embodiment, for a database command received in a database request 117 by the production database server system 121, the database capture component 123 records, in the database workload log 125, (a) data representing the database command (e.g., the text of the SQL statement), (b) one or more database log sequence numbers assigned to the database command that reflect the capture phase transaction environment in which the database command was executed against the production database 127, and (c) the application request identifier included in the database request 117 that contained the database command. Thus, the recorded transaction environment information for a database command—and which is used during the replay phase to synchronize execution of the database command—is linked to the captured application request 105 that caused the database command to be executed.

Database Requests with More than One Database Command

Any given database request may include multiple database commands specified in the order in which they are to be executed. For example, a database request may comprise a database command to begin a transaction followed by one or more database commands to read/modify database data, which are followed by a final database command to commit the transaction to the database. In one embodiment, information recorded in the database workload log 125 for multiple database commands in a database request reflects the specified execution order of the multiple database commands. For example, information for each of the multiple database commands may be recorded in the database workload log 125 in order of the specified execution order.

When replay driver(s) 106 replay captured application workload 111 to the test application server system 112, the database replay component 122 maps application request identifiers in database requests 116 received at the test database server system 1820 to database log sequence numbers contained within the captured database workload 125 and uses the mapped database log sequence numbers to ensure transactional consistency. Referring to the example discussed above, if the "SELECT" command of the second transaction was unable to see the effects of the first transaction when the "SELECT" command was executed relative to the test database 124, then the presence of the database log sequence number in the captured database workload 125 causes the database replay component 122 to ensure that the "SELECT" command also will be unable to see the effects of the first transaction when the "SELECT" command is executed relative to the test database 124. When the database reply component 122 maps an application request identifier to a database log sequence number for a database command, the test database server system 120 abides by the database log sequence number when scheduling the database command for execution against the test database 124.

Disambiguating Transaction Environment Information

A database request 116 received at the test database server system 120 may have multiple database commands. For example, a single database request DBRQ1 may have three database commands DC1, DC2, DC3.

In this case, the application request identifier by itself does not uniquely identify captured transaction environment information for a particular database command of the multiple database commands. In one embodiment, the database replay component 122 disambiguates captured transaction environment information associated with a particular application request identifier in the workload log 125 by comparing the text of a received database command with the text of database commands associated with the particular application request identifier as recorded in the database workload capture log 125. In this way, each of multiple database commands for a particular application request identifier can be associated with its corresponding captured transaction environment information.

In another embodiment, the database replay component 122 assumes that database commands for a particular application request identifier are received at the test database server system 120 during the replay phase in the same order they were received at the production database server system 121 during the capture phase. This latter order may be reflected by the order in which transaction environment information for the multiple database commands is stored in the database workload capture log 125. In this embodiment, when a database command associated with a particular application request identifier is received at the test database server system 120, the database replay component 22 identifies, based on information in the database workload capture log 125, the next captured transaction environment information for the particular application request identifier in order to associate with the received database command.

In one embodiment, a combination of the two above-described techniques is used for disambiguation purposes.

Commit and Non-Commit Actions

In one embodiment of the invention, the database capture component 121 categorizes all database commands executed during the capture phase as either "commit actions" or "non-commit actions." Any database command whose execution causes an entire transaction's effects on a database to be made permanent (i.e., "committed") in the database 127 is classified as a commit action. All other database commands are non-commit actions. For example, execution of a SQL COMMIT command that permanently changes the state of the database is a commit action. All queries are non-commit actions. In one embodiment, SQL INSERT, UPDATE, and DELETE commands are non-commit actions. In one embodiment, data definition ("DDL") statements (e.g., "CREATE TABLE," "DROP TABLE," "ALTER TABLE," etc.) commands are treated as commit actions. The results that are obtained from the execution of a non-commit action depend on the commit actions that have been executed prior to that non-commit action.

"Wait For" and "Commit" Database Log Sequence Numbers

In one embodiment of the invention, when the production database server system 121 receives a database command in a database request 117, the database capture component 123 assigns, to that database command, the "current" database log sequence number, referred to hereinafter as the database command's assigned "wait for" database log sequence number. For example, if the "current" database log sequence number is "90" at the time the production database server system 121 receives the database command, then the database capture component 123 assigns, to that database command, a database log sequence number of 90. This is done for both commit and non-commit actions.

In one embodiment of the invention, commit actions are associated with two separate database log sequence numbers by the database capture component 123: the "wait for" database log sequence number that is assigned to the commit action when the production database server system 121 receives the commit action, and another "commit" database log sequence number that is assigned to the commit action when the production database server system 121 finishes executing the commit action.

Typically, the production database server system 121 increases the "current" database log sequence number whenever the production database server system 121 finishes executing a commit action. A significant amount of database activity may occur in between the time that the production database server system 121 receives a particular commit action and the time that the production database server system 121 finishes executing that particular commit action. As a result, the "current" database log sequence number that is assigned by the database capture component 123 to the commit action when that commit action is done executing may be higher than the database log sequence number that was assigned by the database capture component 123 to the commit action when the production database server system 121 receives that action. Thus, a particular commit action's "wait for" database log sequence number may differ from that particular commit action's "commit" database log sequence number.

In one embodiment of the invention, the database capture component 123 stores, in database workload log 125, both of the database log sequence numbers that are assigned to each commit action in association with the application request identifier included in the database request 117 that contained the commit action. The presence of the "commit" database log sequence number in the database workload log 125 allows the database replay component 122 to determine the value to which the test database server system's 120 replay logical clock should be set after the execution, during the replay phase, of a commit action with which that "commit" database log sequence number is associated.

Commit Point Ordering

In one embodiment of the invention, the database log sequence numbers that are stored in the database workload log 125 are used during the pre-processing activities (discussed above) that are performed prior to the replay phase. In one embodiment of the invention, a dependency graph, which indicates the order in which various database commands need to be executed relative to each other, is built at pre-processing time based on the database change numbers that are associated with those database commands. Thus, the dependency graph may be considered a part of the database workload log 125. The database replay component 122 uses this dependency graph during the replay phase to ensure that database commands are executed in a transactionally consistent manner.

In one embodiment of the invention, the dependency graph is a directed graph in which separate database commands are represented by separate nodes. Each node in the dependency graph may be connected to one or more other nodes by directional links. Links can be incoming or outgoing. A link incoming to a node indicates that the node's database command cannot be executed before the database command of the node from which that link comes. A link outgoing from a node indicates that the node's database command needs to be executed before the database command of the node to which that link goes.

In one embodiment of the invention, the dependency graph is constructed in such a way that the use of the graph by the database replay component 122 ensures that, for each commit action represented by a node in the graph, the test database server system 120 will not execute, before that commit action, any database command that has a "wait for" database log sequence number that is greater than the "commit" database log sequence number of that commit action. Thus, when the dependency graph is constructed, each node that represents a database command that has a "wait for" database log sequence number that is greater than the "commit" database log sequence number of a particular commit action will be placed somewhere "downstream," link-wise, of the particular commit action's node in the dependency graph. This technique is called "commit point ordering."

In one embodiment, commit point ordering allows all non-commit actions that depend on a particular commit action to be executed concurrently during the replay phase. This follows from the realization that, during the capture phase, all non-commit actions that occur temporally between two specific commit actions could have occurred concurrently and in any order without affecting each other's results. Allowing all non-commit actions that depend on a particular commit action be executed concurrently during the replay phase prevents the replay phase execution from degenerating into a largely serial execution of database commands.

In one embodiment of the invention, before the test phase database server system 120 executes a particular database command during the replay phase, the database replay component 122 consults the dependency graph and determines whether the database commands of all other nodes that are "upstream," link-wise, of the particular database command's node in the dependency graph already have been executed relative to the test database 124. The database replay component 122 schedules the particular database command for execution by the test database server system 120 such that the test database server system 120 does not execute the particular database command unless the database commands of all other nodes that are "upstream," link-wise, of the particular database command's node in the dependency graph already have been executed relative to the test database 124.

In one embodiment of the invention, whenever the test database server system 120 executes a database command, the database replay component 122 marks that database command's node in the dependency graph to indicate that the database command has been executed. In this way, execution of database commands during the replay phase may be tracked.

In one embodiment of the invention, whenever the test database server system 120's "current" replay database change number increases during the replay phase (e.g., in response to the execution of a commit action by the test database server system 120), the database replay component 122 determines, based on a comparison of the "current" replay database log sequence number with the database log sequence numbers of the yet-unexecuted database commands that the test database server system 120 has received, which of those database commands the replay phase database server system 120 can now execute. The database replay component 122 instructs the test database server system 120 to proceed to execute each such database command that is associated with a database log sequence number that is not greater than the "current" replay database log sequence number. Whenever the test database server system 120 executes a commit action, the database replay component 122 sets the "current" replay database log sequence number to the value of that commit action's "commit" database log sequence number—the execution of non-commit actions does not cause the database replay component 122 to increase the "current" replay database log sequence number.

In one embodiment, the database replay component 122 maintains the "current" replay database log sequence number for scheduling replayed database commands during the replay phase as a "replay" sequence number that is separate from the "actual" database log sequence number maintained by the test database server system 120 for regular (non-replay) database operation. In this embodiment, the database replay component 122 uses the replay sequence number when scheduling replayed database commands for execution. Maintaining a separate replay sequence number for replay operations allows replay of an application workload without interfering with the actual database log sequence number and regular database operations in the test web application 102.

As mentioned above, each database command executed during the replay phase should "see" the proper state of test phase database 124 when the test database server system 120 executes that database command. For each database command executed during the replay phase, the state of the test database 124 that the database command should "see" when executed is the state that corresponds to the "commit" database log sequence number of the commit action represented by the node from which that database command's node directly depends in the dependency graph. Therefore, in one embodiment of the invention, whenever the test database server system 120 is going to execute a non-commit action, the database replay component 122 first determines the "commit" database log sequence number of the commit action that is immediately "upstream," link-wise, of that non-commit action. The test database server system 120 executes the non-commit action in the context of the database state, or "environment," that is indicated by the "commit" database log sequence number of that commit action (rather than the "wait for" database log sequence number of the non-commit action). This ensures that the database command will not "see" data that should persistently exist only in some future (relative to the database command) database state that the database command ought not to be able to "see." The database command will not "see" any data that was committed in the test database 124 after the immediately "upstream" commit action.

Although the above description refers to the use of database log sequence numbers specifically, various embodiments of the invention may, alternatively, utilize other kinds of transaction environment identifiers whose function and purpose is to represent database state and to ensure transactional consistency between multiple concurrently executing transactions.

Implementing Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
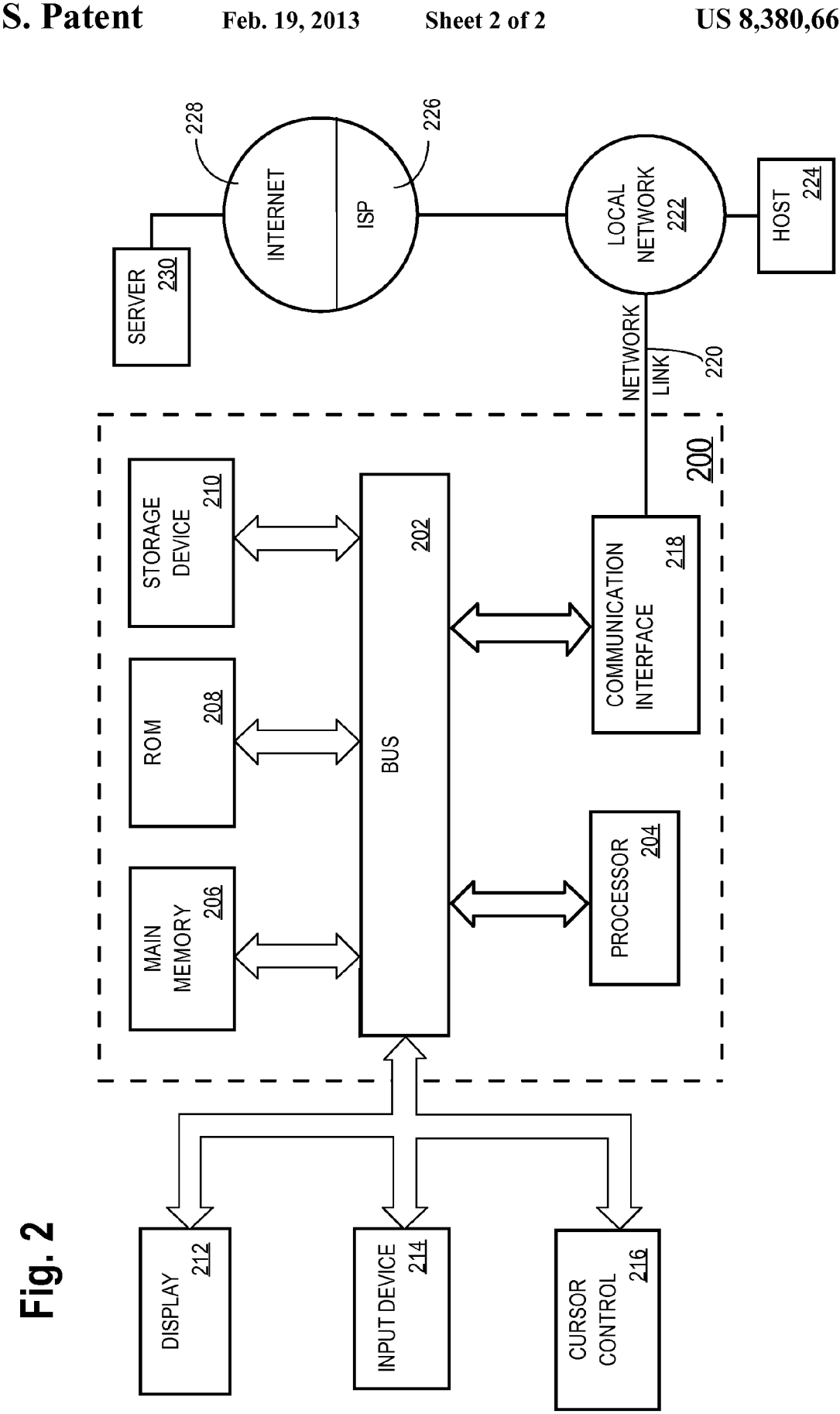
FIG. 2 is a block diagram and schematic illustration of a computer system on which an embodiment of the invention implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    capturing and storing, as a captured application server system workload, a plurality of capture-phase application requests sent to a capture-phase application server system;
    assigning an identifier to each capture-phase application request of the plurality of capture-phase application requests;
    for at least one capture-phase application request of the plurality of capture-phase application requests, propagating the particular identifier assigned to the at least one capture-phase application request in a capture-phase database request caused by the at least one capture-phase application request, wherein the at least one capture-phase database request comprises a database command;
    capturing one or more database sequence numbers assigned to the database command when executed during the capture-phase by a capture-phase database server system against a capture-phase database; and
    storing workload data that represents an association between the database command, the one or more database sequence numbers, and the particular identifier assigned to the at least one capture-phase application request;
    wherein the method is performed by one or more computing devices.

2. The method of claim 1, wherein capturing the plurality of capture-phase application requests comprises a network sniffer capturing the plurality of capture-phase application requests.

3. The method of claim 1, further comprising:
    capturing and storing a plurality of capture-phase application responses sent from the capture-phase application server system in response to the plurality of capture-phase application requests, wherein each capture-phase application response of the plurality of capture-phase application responses comprises the identifier assigned to the capture-phase application request that caused the capture-phase application response to be sent from the production capture-phase application server system.

4. The method of claim 3, further comprising:
    for each stored capture-phase application response of the plurality of stored capture-phase application responses,
        analyzing the stored capture-phase application response to identify the corresponding identifier included in the stored capture-phase application response, and
        modifying the stored capture-phase application request that caused the stored capture-phase application response to include the corresponding identifier such that the stored capture-phase application request, when replayed, will include the corresponding identifier in the replayed request.

5. The method of claim 1, further comprising:
    during a replay-phase in which the plurality of capture-phase application requests are being replayed against a replay-phase application server system:
        receiving, at a replay-phase database server system, a replay-phase database request comprising the database command and the particular identifier of the at least one capture-phase application request;
        based upon the particular identifier of the at least one capture-phase application request and the stored workload data, determining the one or more database sequence numbers that were previously assigned to the database command when previously executed against a capture-phase database during the capture phase;
        based upon the one or more database sequence numbers, determining whether to delay execution of the database command against a replay-phase database at least until a particular replay-phase database transaction has been committed to the replay-phase database.

6. The method of claim 5, further comprising:
in response to determining that the particular replay-phase database transaction has not yet been committed to the replay-phase database, delaying execution of the database command against the replay-phase database at least until the particular replay-phase database transaction is committed to the replay-phase database; and
in response to committing the particular replay-phase database transaction to the replay-phase database, executing the database command against the replay-phase database.

7. The method of claim 5, further comprising:
based upon the particular identifier of the at least one capture-phase application request and the stored workload data, determining a database sequence number that was previously assigned to the database command when previously executed against the capture-phase database during the capture-phase that reflects a version of the capture-phase database that the database command was previously executed against during the capture phase.

8. The method of claim 5, further comprising:
based upon the particular identifier of the at least one capture-phase application request and the stored workload data, determining a database sequence number that was previously assigned to the database command when previously executed against the capture-phase database during the application workload capture phase that reflects a version of the capture-phase database that resulted from the previous execution of the database command during the capture phase.

9. The method of claim 5, wherein the replay-phase database server system maintains at least two separate logical locks for tracking changes to the replay-phase database, one logical clock of the at least two logical clocks for tracking all changes to the replay-phase database and the other logical clock of the at least two logical clocks for tracking just changes to the replay-phase database that result from replayed database commands.

10. The method of claim 1, wherein the capture-phase application server system and the replay-phase application server system is the same application server system and/or the capture-phase database server system and the replay-phase database server system is the same database server system.

11. One or more non-transitory computer-readable media having computer-executable instructions recorded thereon for performing a method comprising:
capturing and storing, as a captured application server system workload, a plurality of capture-phase application requests sent to a capture-phase application server system;
assigning an identifier to each capture-phase application request of the plurality of capture-phase application requests;
for at least one capture-phase application request of the plurality of capture-phase application requests, propagating the particular identifier assigned to the at least one capture-phase application request in a capture-phase database request caused by the at least one capture-phase application request, wherein the at least one capture-phase database request comprises a database command;
capturing one or more database sequence numbers assigned to the database command when executed during the capture-phase by a capture-phase database server system against a capture-phase database; and
storing workload data that represents an association between the database command, the one or more database sequence numbers, and the particular identifier assigned to the at least one capture-phase application request.

12. The medium of claim 11, wherein capturing the plurality of capture-phase application requests comprises a network sniffer capturing the plurality of capture-phase application requests.

13. The medium of claim 11, further comprising:
capturing and storing a plurality of capture-phase application responses sent from the capture-phase application server system in response to the plurality of capture-phase application requests, wherein each capture-phase application response of the plurality of capture-phase application responses comprises the identifier assigned to the capture-phase application request that caused the capture-phase application response to be sent from the capture-phase application server system.

14. The medium of claim 13, further comprising:
for each stored capture-phase application response of the plurality of stored capture-phase application responses,
analyzing the stored capture-phase application response to identify the corresponding identifier included in the stored capture-phase application response, and
modifying the stored capture-phase application request that caused the stored capture-phase application response to include the corresponding identifier such that the stored capture-phase application request, when replayed, will include the corresponding identifier in the replayed request.

15. The medium of claim 11, further comprising:
during a replay-phase in which the plurality of capture-phase application requests are being replayed against a replay-phase application server system:
receiving, at a test-replay-phase database server system, a replay-phase database request comprising the database command and the particular identifier of the at least one capture-phase application request;
based upon the particular identifier of the at least one capture-phase application request and the stored workload data, determining the one or more database sequence numbers that were previously assigned to the database command when previously executed against the capture-phase database during the capture phase;
based upon the one or more database sequence numbers, determining whether to delay execution of the database command against a replay-phase database at least until a particular replay-phase database transaction has been committed to the replay-phase database.

16. The medium of claim 15, further comprising:
in response to determining that the particular replay-phase database transaction has not yet been committed to the replay-phase database, delaying execution of the database command against the replay-phase database at least until the particular replay-phase database transaction is committed to the replay-phase database; and
in response to committing the particular replay-phase database transaction to the replay-phase database, executing the database command against the replay-phase database.

17. The medium of claim 15, further comprising:
based upon the particular identifier of the at least one capture-phase application request and the stored workload data, determining a database sequence number that was previously assigned to the database command when previously executed against the capture-phase database during the capture-phase that reflects a version of the capture-phase database that the database command was previously executed against during the capture phase.

18. The medium of claim 15, further comprising:

based upon the particular identifier of the at least one capture-phase application request and the stored workload data, determining a database sequence number that was previously assigned to the database command when previously executed against the capture-phase database during the application workload capture phase that reflects a version of the capture-phase database that resulted from the previous execution of the database command during the capture phase.

19. The medium of claim 15, wherein the replay-phase database server system maintains at least two separate logical locks for tracking changes to the replay-phase database, one logical clock of the at least two logical clocks for tracking all changes to the replay-phase database and the other logical clock of the at least two logical clocks for tracking just changes to the replay-phase database that result from replayed database commands.

20. The medium of claim 11, wherein the capture-phase application server system and the replay-phase application server system is the same application server system and/or the capture-phase database server system and the replay-phase database server system is the same database server system.

* * * * *

UNITED STATES PATENT AND TRADEMARK OFFICE
CERTIFICATE OF CORRECTION

PATENT NO. : 8,380,665 B2  Page 1 of 1
APPLICATION NO. : 13/076313
DATED : February 19, 2013
INVENTOR(S) : Papadomanolakis et al.

It is certified that error appears in the above-identified patent and that said Letters Patent is hereby corrected as shown below:

In the Specifications:

In column 2, line 32, delete "USER 1." and insert -- USER1. --, therefor.

In column 2, line 44, delete "USER 1" and insert -- USER1 --, therefor.

In column 8, line 3, after "124" insert -- . --.

In the Claims:

In column 24, line 37, in Claim 3, before "capture-phase" delete "production".

In column 26, line 36, in Claim 15, delete "test-replay-phase" and insert -- replay-phase --, therefor.

Signed and Sealed this
Fourteenth Day of May, 2013

Teresa Stanek Rea
*Acting Director of the United States Patent and Trademark Office*